Patented Apr. 4, 1950

2,502,934

UNITED STATES PATENT OFFICE 2,502,934

STABILIZATION OF SULFOLANYL ETHERS

Daniel W. Elam, Rupert C. Morris, and John L. Van Winkle, Berkeley, Calif., assignors to Shell Development Company, San Francisco, Calif., a corporation of Delaware No Drawing. Application September 24, 1946, Serial No. 699,084

15 Claims. (Cl. 260—329)

This invention relates to the stabilization of sulfolanyl ethers. The invention more particularly relates to a method for the prevention or inhibition of the formation of undesirable decomposition products in the sulfolanyl ethers. The invention also relates to the stabilized compositions consisting of or comprising sulfolanyl ethers.

The sulfolanyl ethers are in general water-white in color when freshly prepared. Some sulfolanyl ethers remain water-white when exposed to the air over a long period of time or when exposed to relatively high temperatures. Many sulfolanyl ethers, however, darken when exposed to air for a short period of time or when exposed to heat. This tendency to form a dark color may probably be ascribed to the formation of dark-colored sulfur containing bodies in the nature of sulfur-containing polymers formed by the decomposition of the sulfone and subsequent polymerization of the decomposition products. However, the exact nature of the decomposition products is not definitely known at this time. The tendency of the sulfolanyl ethers to form such decomposition products is highly undesirable as it renders the ethers unsuited for many uses for which they might be used either by themselves or in admixture with other materials. The use of such sulfolanyl ethers in compositions as resins, etc., for example, are undesirable because they cause a discoloration and embrittlement of the resulting product. A large field of otherwise commercially valuable sulfolanyl ethers have thus been rendered useless because of this tendency to form undesirable decomposition products.

It is an object of the invention to provide a practical and highly effective method for substantially preventing or inhibiting the formation of the undesirable decomposition products which results in the discoloration of the sulfolanyl ethers. Such stabilized sulfolanyl ethers either by themselves or in admixture with other materials can be stored for extended periods of time and may be heated to relatively high temperatures in the production of other products without any discoloration taking place.

It is another object of the invention to provide novel and useful compositions consisting of or comprising sulfolanyl ethers which are substantially stabilized against decomposition with its resulting discoloration and embrittlement of the composition. These stable compositions may be stored for long periods of time and may be heated at elevated temperatures without becoming discolored or embrittled. Such stabilized compositions are useful for a wide variety of purposes and they are useful as raw materials in the production of a wide variety of products.

It has now been discovered that the formation of the undesirable decomposition products, the presence of which is responsible for the darkening of the sulfolanyl ethers and the darkening and embrittlement of the sulfolanyl ether compositions may be prevented and the products kept in a substantially water-white form by the incorporation into the sulfolanyl ether or sulfolanyl ether composition of a stabilizing amount of a phenolic body. By the term "stabilizing amount," is meant an amount of a phenolic body or mixture of phenolic bodies effective to stabilize the sulfolanyl ethers against decomposition. Such stabilized sulfolanyl ethers and sulfolanyl ether compositions can readily be stored, exposed to air, light and heat for long periods of time without any decomposition resulting in discoloration or embrittlement of the product.

Any sulfolanyl ether undergoing decomposition on exposure to air for a period of time or on exposure to heat can be stabilized by this method. Compounds embraced by the term "sulfolanyl ethers" are those compounds of the general formula S—O—R wherein S is a sulfolanyl radical or a substituted sulfolanyl radical and R is an organic radical. By the term "sulfolanyl radical" is meant a cyclic saturated sulfone consisting of a five-membered heterocyclic ring of four nuclear carbon atoms and a sulfonyl radical. The structural formula of the sulfolanyl radical as employed in the specification and appended claims is represented by

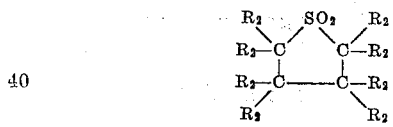

wherein one $R_2$ represents the free bond of the radical and each of the other $R_2$'s represent hydrogen atoms.

By the term "substituted sulfolanyl radical" as employed throughout the specification and claims is means a substituted cyclic saturated sulfone radical having the following general structural formula:

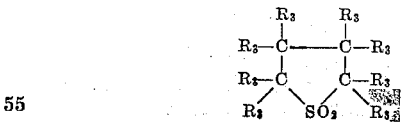

wherein one $R_3$ represents the free bond of the radical, at least one of the other $R_3$'s represents a halogen atom, or an organic radical, and the remaining $R_3$'s are hydrogen atoms.

The R of the general structural formula of the sulfolanyl ethers and the $R_3$ of the structural formula of the substituted sulfolanyl radical may be an organic radical. Preferred organic radicals are the hydrocarbon radicals and the substituted hydrocarbon radicals. The more preferred of the two groups of radicals are the hydrocarbon radicals which may be cyclic or acyclic, saturated, unsaturated or aromatic, such as the alkyl, alkenyl, aryl, alkaryl, alkenaryl, aralkyl, aralkenyl, cycloalkyl and cycloalkenyl radicals. Examples of the hydrocarbon radicals are methyl, ethyl, propyl, isopropyl, normal butyl, isobutyl, secondary butyl, tertiary butyl, isopentyl, secondary pentyl, hexyl, normal octyl, isooctyl, trimethyl octodecyl, allyl, methallyl, methyl vinyl carbinyl, pentenyl, hexenyl, phenyl, diphenyl, naphthyl, anthryl, tolyl, secondary butyl-naphthyl, dipropyl-naphthyl, cyclohexenyl, trimethyl-cyclohexyl, cyclopentenyl, etc.

The substituted hydrocarbon radicals, represented by R and $R_3$ are those hydrocarbon radicals described above wherein one or more hydrogen atom has been replaced by an inorganic element or radical or by an organic radical containing one or more oxygen, nitrogen or sulfur atom. Examples of the inorganic radicals, containing inorganic elements, that may be attached to the hydrocarbon radicals are the chlorine, bromine and iodine atoms, and the sulfate, sulfite, nitrate and nitrite radicals. Examples of the organic radicals, containing inorganic elements, that may be attached to the hydrocarbon radicals are the hydroxyl, carboxyl, ether, thioether, etc., radicals.

The radicals which R and $R_3$ may represent also include the heterocyclic radicals in which an oxygen, nitrogen, sulfur, etc., atom or atoms is included in the ring system. Examples of such radicals are furfuryl, thiophenyl, sulfolanyl, pyridinyl, etc.

A group of the above-described sulfolanyl ethers which are particularly subjected to decomposition action and the formation of the dark-colored impurities when exposed to air and heat and which can readily be stabilized by the method of the invention are those sulfolanyl ethers according to the above-described general formula wherein R is an organic radical, preferably a hydrocarbon radical, containing from 1 to 20 carbon atoms. Examples of such a group are:

Isopropyl 3-sulfolanyl ether
Crotyl 3-sulfolanyl ether
Hexenyl 3-(2,4-dibutyl) sulfolanyl ether
Nonenyl 3-sulfolanyl ether
n-Decyl 3-sulfolanyl ether
Lauryl 3-(2,4-diethyl) sulfolanyl ether
Benzyl 3-sulfolanyl ether
m-Cresyl 3-sulfolanyl ether
Tetrahydro-furfuryl 3-sulfolanyl ether
3,3,5-trimethylcyclohexyl 3-sulfolanyl ether
2,4,6-trimethylcyclohexyl carbinyl 3-sulfolanyl ether
Dodecyl 3-sulfolanyl ether
Tetradecyl 3-sulfolanyl ether
Pentadecyl 3-(2,4-dimethyl) sulfolanyl ether
Octadecyl 3-sulfolanyl ether
Eicosyl 3-(2,4-diethyl) sulfolanyl ether The sulfolanyl ether stabilizing agents or dark-color formation inhibiting agents used in accordance with the present invention are termed phenolic bodies. The term "phenolic body" as used herein and in the appended claims embraces those organic compounds containing an aromatic radical and at least one hydroxyl group, said hydroxyl group being linked to a carbon atom embraced in the nucleus of the aromatic radical. A phenolic body may be mono- or polyhydric, that is one or more carbon atoms embraced in the aromatic radical may be linked to hydroxy groups. Other hydrogen atoms of the aromatic nucleus may be replaced by suitable organic or inorganic substituents provided that such substituents are non-reactive toward the sulfolanyl ether to which they are added. Suitable non-interfering groups are the saturated or unsaturated, cyclic or acyclic or aromatic hydrocarbon radicals, the halogen atoms, the OH group, ether group, sulfone group, nitroso group, etc.

Representative examples of the phenolic bodies are the following: phenol, the cresols, the naphthols, the anthrols, the xylenols, cummenol, carvacrol, thymol, catechol, resorcinol, hydroquinone, phloroglucinol, eugenol, isoeugenol, guaiacol, vanillin, zingerone, the bromo- and chlorophenols, -naphthols, -cresols, -anthrols, -xylenols, etc., chlorohydroquinone, dichlorhydroquinone, nitrosophenol, the nitroso-naphthosols, -cresols, -anthrols, -xylenols, etc., the monoalkyl or monoalkenyl ethers of resorcinol, hydroquinone, pyrogallol, phloroglucinol, etc., 2,5-dimethyl phenol, 2-methyl, 4-butyl phenol, 2,4-dimethyl, 6-tertiary-butyl phenol, pentamethyl phenol, 4-methyl catechol, 4-tertiary-butyl catechol, 4-ethyl-resorcinol, 4,4'-dihydroxy diphenyl, 3,3', 5,5'-tetramethyl-4,4'-dihydroxyl diphenyl, p-phenyl phenol, hydroquinone monobenzyl ether, and the like as well as their homologues and analogues and suitable substitution products. If desired, mixtures of the phenolic bodies may be used. For example, mixtures of phenolic bodies obtained as by-products in chemical and oil refining processes and the like are suitable.

The invention is not limited to the use of any specific proportion of the phenolic body or bodies. In some cases, the presence of the phenolic body in a concentration equal to about 0.001% by weight of the sulfolanyl ether content of the material to be stabilized may be effective; in other cases, it may be desirable to use as much as about 5% or more of the phenolic body. The amount of the phenolic body to be used to stabilize the sulfolanyl ether or sulfolanyl ether composition to the desired extent will generally be dependent upon the specific stabilizing agent, upon the particular ether or ether composition to be stabilized, and upon the conditions to which the stabilized material will be subjected. In the majority of cases, the phenolic bodies have the desired effectiveness when employed in concentrations from about 0.002% to about 2% by weight of the ether content of the material to be stabilized.

The phenolic bodies may be added to the material to be stabilized in any desirable manner. The phenolic bodies may be added per se or suspended or dissolved in a suitable media. It is in general desirable to select the specific stabilizing material with respect to the sulfolanyl ether or sulfolanyl ether composition to be stabilized so that the former is soluble to the desired extent in the latter. It may be desirable to select the phenolic body with respect to the material to be stabilized so that it may, if desired, be subsequently separated therefrom by some convenient means as distillation, extraction, etc. When the substantially pure sulfolanyl ethers are stabilized, it may be desirable to elect a phenolic body which will not discolor the ether in which it is dissolved. For example, although in a particular case pyrogallol and hydroquinone may be equally effective, the latter is preferred if discoloration of the ether is to be avoided.

The material to be stabilized in accordance with the invention may consist of one or more of the above-described sulfolanyl ethers. The ether or ethers to be stabilized may be in admixture with an organic solvent or diluent. Suitable organic solvents or diluents which may contain in solution one or more of the sulfolanyl ethers and to which solution a phenolic body can be added to stabilize the ether against decomposition are the following; the aromatic and aralkyl hydrocarbons as benzene, toluene, xylene, ethyl benzene, cymene, tetrahydrobenzene, etc.

The invention also embraces the stabilization of compositions comprising or consisting of any of the above-described sulfolanyl ethers. Examples of compositions containing sulfolanyl ethers for which a colorless product is highly desirable and which can be readily stabilized according to the method of invention are the resins and plastic compositions. When cellulose acetate, for example, is plasticized with a sulfolanyl ether a very tough, flexible, clear plastic is produced but when the product is allowed to stand in air for an extended period of time or is exposed to an elevated temperature it soon becomes discolored and embrittled. When a stabilizing phenolic body is incorporated into the composition, however, tough, clear, flexible products result that can be stored for long periods of time and can be subjected to high molding temperatures without the expected discoloration and embrittlement. The stabilizing phenolic bodies may be added to the sulfolanyl ether before the ether is added to the resin or plastic-forming composition or it may be added to the composition with the sulfolanyl ethers or after the sulfolanyl ethers have been added. It is sometimes advisable to mix the stabilizing agent with the sulfolanyl ether before adding the ether or ethers to the composition. The composition to which the stabilized ether or ethers or the phenolic body alone is added may be in any form desired and may sometimes be dissolved in a suitable solvent such as those described above for dissolving the sulfolanyl ethers.

To illustrate the effectiveness of some representative phenolic bodies in inhibiting the formation of dark-colored impurities in the sulfolanyl ethers the following examples are given. It is to be understood that the examples are for the purpose of illustration and the invention is not to be regarded as limited to the specific sulfolanyl ethers stabilized nor to the specific phenolic bodies and mixtures thereof recited. In order to express the shades of color more uniformly throughout the examples the colors of the resulting products have been compared to the Gardner scale on which the readings vary from No. 1, a water-white color, to No. 18 which is a dark-brown color.

Example I

To illustrate the production of the dark-colored decomposition impurities when the sulfolanyl ethers are subjected to elevated temperatures several of the sulfolanyl ethers were heated without the presence of the stabilizing agent at a temperature of 105° C. for about 51 hours.

Trimethylcyclohexyl carbinyl 3-sulfolanyl ether was heated at 105° C. in the presence of air for 51 hours. The ether began to discolor very soon after heating had commenced and at the end of 51 hours heating the ether had a dark-brown color. The Gardner scale reading of the sample after heating for 51 hours was 18.

N-decyl 3-sulfolanyl ether was heated at 105° C. in the presence of air for 51 hours. The ether sample began to discolor after several hours of heating and at the end of 51 hours of constant heating gave a Gardner scale reading of 18.

Two other substances used for a few of the purposes for which the sulfolanyl ethers can be utilized were heated under the same conditions for comparative reasons. When 2-ethylhexyl sebacate and dioctyl phthalate were heated for 51 hours at 105° C. little if any change was noted in the colors of the materials.

Example II

Approximately 7.5 parts of trimethylcyclohexyl carbinyl 3-sulfolanyl ether was treated with approximately 0.29% by weight of hydroquinone, based on the weight of the sulfolanyl ether. The mixture was then heated to 105° C. in the presence of air and maintained at that temperature for about 51 hours. After 15 hours of heating the sulfolanyl ether gave a Gardner scale reading of less than 1. After 51 hours the Gardner scale reading was between 1 and 2.

Example III

Approximately 4.38 parts of trimethylcyclohexyl carbinyl 3-sulfolanyl ether was treated with approximately 0.58% by weight of 2,4-dimethyl-6-tertiary-butyl phenol, based on the weight of the sulfolanyl ether. The mixture was then heated to 105° C. in the presence of air and maintained at that temperature for approximately 51 hours. After 15 hours of heating the sulfolanyl ether had a Gardner scale reading of less than 1. After 51 hours of constant heating the sulfolanyl ether still gave a Gardner scale reading of less than 1.

Example IV

Approximately 5.7 parts of trimethylcyclohexyl carbinyl 3-sulfolanyl ether was treated with approximately 0.3% by weight of 3,3',5,5'-tetramethyl-4,4'-dihydroxy diphenyl, based on the weight of the sulfolanyl ether. The mixture was then heated to 105° C. in the presence of air and maintained at that temperature for approximately 51 hours. After 51 hours of constant heating the sulfolanyl ether still only had a very slight yellow color which was partly due to the color of the inhibitor used.

Example V

About 5.6 parts of trimethylcyclohexyl carbinyl 3-sulfolanyl ether was treated with approximately 0.3% by weight of pentamethyl phenol, based on the weight of the sulfolanyl ether. The mixture was then heated to 105° C. in the presence of air and maintained at that temperature for approximately 51 hours. After 23 hours of constant heating the ether sample had a Gardner scale reading of 1. After 51 hours of heating the ether still had a water-white color.

Example VI

Approximately 4.5 parts of trimethylcyclohexyl carbinyl 3-sulfolanyl ether was treated with approximately 0.55% by weight of p-tertiary-butyl catechol, based on the weight of the sulfolanyl ether. The mixture was then heated to 105° C. in the presence of air and maintained at that temperature for approximately 51 hours. After 51 hours of heating the ether sample still only had a very slight yellow color.

Example VII

N-decyl 3-sulfolanyl ether is stabilized against discoloration by adding about 0.3% by weight of hydroquinone, based on the weight of the sulfolanyl ether, to a quantity of the n-decyl 3-sulfolanyl ether which has been freshly prepared.

Example VIII

N-decyl 3-sulfolanyl ether is also stabilized against discoloration by adding about 0.5% by weight of 2,4-dimethyl-6-tertiary-butyl phenol, based on the weight of the sulfolanyl ether, to a quantity of the n-decyl 3-sulfolanyl ether which has been freshly prepared.

Example IX

In a manner similar to that described in Example III for the stabilization of trimethylcyclohexyl carbinyl 3-sulfolanyl ether, 3,3,5-trimethylcyclohexyl 3-sulfolanyl ether, m-cresyl 3-sulfolanyl ether, tetradecyl 3-sulfolanyl ether, lauryl 3-(2,4-dimethyl) sulfolanyl ether, pentadecyl 3-(2,4-dimethyl) sulfolanyl ether, hexenyl 3-(2,4-dibutyl) sulfolanyl ether are stabilized against discoloration by the addition of about 0.5% by weight of 2,4-dimethyl-6-tertiary-butyl phenol.

Example X

In a manner similar to that described in Example VI for the stabilization of n-decyl 3-sulfolanyl ether, 2-chloro-butyl 3(2,5-diethyl) sulfolanyl ether, methallyl 3-sulfolanyl ether, ethyl isopropenyl carbinyl 3-(2,5-diphenyl) sulfolanyl ether, chlorallyl 3-(2,4-dimethyl) sulfolanyl ether, 3'-ethylfurfuryl 3-sulfolanyl ether, 2'-pyridylmethyl 3-sulfolanyl ether, 5'-methyl-2'-thienylmethyl 3-sulfolanyl ether, propallyl 3-(2-vinyl) sulfolanyl ether are stabilized against discoloration by the addition of about 0.3% by weight of hydroquinone.

Example XI

To illustrate how compositions containing the sulfolanyl ethers are discolored and embrittled on exposure to air or elevated temperatures and how the discoloration and embrittlement may be prevented by the use of the above-described stabilizing agents the following examples are cited.

Approximately 120 parts of cellulose acetate were mixed with about 45 parts of trimethylcyclohexyl carbinyl 3-sulfolanyl ether and the mixture was dissolved in the minimum quantity of acetone. The acetone solution was cast into thin layers and allowed to dry. The resulting product was then molded into tough, flexible, clear plastic discs. The discs were subjected to a temperature of 100° C. for 2 days. At the end of that period the discs had all turned a dark brown color and had become very brittle.

Approximately 120 parts of cellulose acetate were mixed with about 45 parts of trimethylcyclohexyl carbinyl 3-sulfolanyl ether and 0.45 part of p-tertiary butyl catechol and the mixture was dissolved in the minimum quantity of acetone. The acetone solution was cast in thin layers and allowed to dry. The resulting product was then molded into discs which had the same properties as those discs produced without the use of the stabilizing agents, i. e. they were tough, flexible and had a clear color. The discs were subjected to a temperature of 100° C. for 2 days to attempt to produce the expected discoloration and embrittlement. After the heating of the discs for 2 days there was no trace of discoloration or embrittlement or a change in any of the properties possessed by the discs before the heating commenced.

Example XII

To about 120 parts of cellulose acetate was added about 45 parts of trimethylcyclohexyl carbinyl 3-sulfolanyl ether and about 0.12 part of 2,4-dimethyl-6-tertiary-butyl phenol and the mixture was dissolved in acetone. The solution was then cast into thin layers and allowed to dry. The resulting product was molded into discs which were subjected to a temperature of 100° C. for 2 days. After the period of heating, the discs still had the properties of being tough, flexible, clear discs without any sign of discoloration or embrittlement.

Example XIII

In a manner and in proportions described in Example XI cellulose acetate and trimethylcyclohexyl carbinyl 3-sulfolanyl ether mixtures were stabilized with hydroquinone monobenzyl ether and with para-phenyl phenol. No discoloration or embrittlement were detected after subjecting both types of discs to a temperature of 100° C. for 2 days.

Example XIV

Cellulose acetate and n-decyl 3-sulfolanyl ether mixtures are stabilized against discoloration and embrittlement by incorporation wherewith the appropriate amount of hydroquinone, pentamethyl phenol, 2,4-dimethyl-6-tertiary-butyl phenol, p-tertiary-butyl catechol and para-phenyl phenol.

We claim as our invention:

1. A method for stabilizing trimethylcyclohexyl carbinyl 3-sulfolanyl ether against discoloration which comprises adding thereto from about .001% to about 5% by weight of 2,4-dimethyl-6-tertiary-butyl phenol.

2. A method for stabilizing trimethylcyclohexyl carbinyl 3-sulfolanyl ether against discoloration which comprises adding thereto from about .001% to about 5% by weight of hydroquinone.

3. A process for stabilizing trimethylcyclohexyl carbinyl 3-sulfolanyl ether which comprises adding thereto from about .001% to about 5% by weight of pentamethyl phenol.

4. A process for stabilizing a sulfolanyl ether which comprises adding thereto a stabilizing amount of hydroquinone, said sulfolanyl ether consisting of a sulfolanyl radical joined to an oxygen atom which in turn is joined directly to a hydrocarbon radical containing from 1 to 20 carbon atoms.

5. A process for stabilizing a sulfolanyl ether against discoloration which comprises adding thereto a stabilizing amount of pentamethyl phenol, said sulfolanyl ether consisting of a sulfolanyl radical joined to an oxygen atom which in turn is joined directly to a hydrocarbon radical containing from 1 to 20 carbon atoms.

6. A method for stabilizing a sulfolanyl ether which comprises adding thereto a stabilizing amount of 2,4-dimethyl-6-tertiary-butyl phenol, said sulfolanyl ether consisting of a sulfolanyl radical joined to an oxygen atom which in turn is joined directly to a hydrocarbon radical containing from 1 to 20 carbon atoms.

7. A composition stabilized against discoloration consisting essentially of trimethylcyclohexyl carbinyl 3-sulfolanyl ether and from about 0.001% to about 5.0% by weight of hydroquinone.

8. A stable composition consisting essentially of trimethylcyclohexyl carbinyl 3-sulfolanyl ether and a stabilizing amount of 2,4-dimethyl-6-tertiary-butyl phenol.

9. A composition stabilized against discoloration consisting essentially of trimethylcyclohexyl carbinyl 3-sulfolanyl ether and a stabilizing amount of pentamethyl phenol.

10. A composition of matter stabilized against discoloration consisting essentially of a sulfolanyl ether and a stabilizing amount of 2,4-dimethyl-6-tertiary-butyl phenol, said sulfolanyl ether consisting of a sulfolanyl radical joined to an oxygen atom which in turn is joined directly to a hydrocarbon radical containing from 1 to 20 carbon atoms.

11. A composition of matter stabilized against discoloration consisting essentially of a sulfolanyl ether and a stabilizing amount of hydroquinone, said sulfolanyl ether consisting of a sulfolanyl radical joined to an oxygen atom which in turn is joined directly to a hydrocarbon radical containing from 1 to 20 carbon atoms.

12. A process for stabilizing a sulfolanyl ether of the general formula S—O—R wherein S is a sulfolanyl radical and R is a hydrocarbon radical containing from 1 to 20 carbon atoms against discoloration, which comprises adding thereto from .001% to 5% by weight of a phenolic compound containing an aromatic ring at least one ring carbon atom of which is joined to a hydroxyl group, said aromatic ring occurring no more than twice in the molecule of the said phenolic compound.

13. A process for stabilizing an ether of the group consisting of sulfolanyl ethers, substituted sulfolanyl ethers and mixtures thereof, which becomes discolored when exposed to air and heat for a short period of time, comprising adding to the said ether a stabilizing amount of at least one phenolic compound containing an aromatic ring at least one ring carbon atom of which is joined to a hydroxyl group, said aromatic ring occurring not more than twice in the molecule of the said phenolic compound.

14. A composition stabilized against discoloration consisting essentially of a sulfolanyl ether of the formula S—O—R wherein S is a sulfolanyl radical and R is a hydrocarbon radical containing from 1 to 20 carbon atoms, and from .001% to 5% by weight of a phenolic compound containing an aromatic ring at least one ring carbon atom of which is joined to a hydroxyl group, said aromatic ring occurring not more than twice in the molecule of the said phenolic compound.

15. A composition stabilized against discoloration consisting essentially of an ether of the group consisting of sulfolanyl ethers, substituted sulfolanyl ethers and mixtures thereof, which becomes discolored when exposed to air and heat for a short period of time and a stabilizing amount of at least one phenolic compound containing an aromatic ring at least one ring carbon atom of which is joined to a hydroxyl group, said aromatic ring occurring not more than twice in the molecule of the said phenolic compound.

DANIEL W. ELAM.
RUPERT C. MORRIS.
JOHN L. VAN WINKLE.

REFERENCES CITED

The following references are of record in the file of this patent:

UNITED STATES PATENTS

| Number | Name | Date |
| --- | --- | --- |
| 2,219,006 | Delfs | Oct. 22, 1940 |
| 2,375,708 | Tinsley | May 8, 1945 |
| 2,383,361 | Bass | Aug. 21, 1945 |